US012649188B2

(12) United States Patent
Zettler et al.

(10) Patent No.: US 12,649,188 B2
(45) Date of Patent: Jun. 9, 2026

(54) CUTTING HEAD HAVING ROTATIONALLY ASYMMETRIC COUPLING PIN, TOOL SHANK AND CUTTING TOOL

(71) Applicant: ISCAR, LTD., Tefen (IL)

(72) Inventors: Martin Ulrich Zettler, Vaihingen-Horrheim (DE); Nikolaos Poussios, Vaihingen-Horrheim (DE)

(73) Assignee: ISCAR, LTD., Tefen (IL)

( * ) Notice: Subject to any disclaimer, the term of this patent is extended or adjusted under 35 U.S.C. 154(b) by 562 days.

(21) Appl. No.: 18/187,999

(22) Filed: Mar. 22, 2023

(65) Prior Publication Data

US 2024/0316653 A1 Sep. 26, 2024

(51) Int. Cl.
B23B 29/04 (2006.01)
B23B 27/10 (2006.01)
B23B 31/07 (2006.01)
B23B 31/107 (2006.01)
B23B 27/04 (2006.01)

(52) U.S. Cl.
CPC ............ B23B 29/046 (2013.01); B23B 27/10 (2013.01); B23B 31/1075 (2013.01); *B23B 27/04* (2013.01); *B23B 2231/0204* (2013.01)

(58) Field of Classification Search
CPC ................ B23B 31/1075; B23B 27/04; B23B 2231/0204; B23B 2231/0208; B23B 2231/46; B23B 2240/36; B23B 29/046; B23B 27/10
See application file for complete search history.

(56) References Cited

U.S. PATENT DOCUMENTS

| | | | |
|---|---|---|---|
| 5,873,682 A | 2/1999 | Tripsa | |
| 6,270,293 B2 | 8/2001 | Erickson et al. | |
| 8,696,270 B2 | 4/2014 | Shitrit et al. | |
| 9,120,164 B2 | 9/2015 | Guy et al. | |
| 9,505,059 B2 * | 11/2016 | Chen ..................... | B23B 29/046 |

(Continued)

FOREIGN PATENT DOCUMENTS

| | | | |
|---|---|---|---|
| DE | 102017210986 A1 * | 1/2019 | ........... B23B 51/108 |
| DE | 10 2019 111 843 A1 | 11/2020 | |

(Continued)

OTHER PUBLICATIONS

International Search Report dated May 24, 2024, issued in PCT counterpart application No. PCT/IL2024/050212.

(Continued)

*Primary Examiner* — Sara Addisu
(74) *Attorney, Agent, or Firm* — Womble Bond Dickinson (US) LLP

(57) ABSTRACT

A cutting tool includes a cutting head and a tool shank, each having an axial abutment surface. One of the two includes a coupling pin, while the other includes a pin receptacle and a clamping through bore that opens out to the pin receptacle. The coupling pin has an engagement groove and the pin receptacle has an engagement ridge. The coupling pin is received into the pin receptacle. The cutting head and tool shank are releasably attached together by a fastening member that passes through the clamping through bore and acts on the coupling pin so that the engagement groove abuts the engagement ridge and the axial abutment surfaces on each part abut each other.

24 Claims, 10 Drawing Sheets

(56) References Cited

U.S. PATENT DOCUMENTS

| | | | | |
|---|---|---|---|---|
| 10,888,979 | B2 * | 1/2021 | Muncy .................... | B25B 13/06 |
| 10,933,475 | B2 * | 3/2021 | Sendzik ................ | B23B 31/117 |
| 11,213,900 | B2 * | 1/2022 | Burgess ................ | E21B 17/046 |
| 11,305,359 | B2 * | 4/2022 | Kimmich ................ | B23B 29/04 |
| 11,548,075 | B2 * | 1/2023 | Moerk ..................... | B23C 5/26 |
| 11,577,323 | B2 * | 2/2023 | Rabouh ................ | B23B 29/046 |
| 12,337,395 | B2 * | 6/2025 | Suzuki .................... | B23B 29/32 |
| 2012/0099938 | A1 | 4/2012 | Shitrit et al. | |
| 2015/0231708 | A1 * | 8/2015 | McCormick ............ | B23B 31/08 |
| | | | | 451/28 |
| 2015/0266101 | A1 * | 9/2015 | Rimet .................. | B23D 77/006 |
| | | | | 407/56 |
| 2016/0101472 | A1 * | 4/2016 | Chen ..................... | B23B 29/046 |
| | | | | 82/161 |
| 2016/0107242 | A1 * | 4/2016 | McCormick ............ | B23B 31/08 |
| | | | | 279/143 |
| 2016/0236282 | A1 * | 8/2016 | Kitagawa .............. | B23B 27/007 |
| 2019/0001421 | A1 * | 1/2019 | Herud .................... | B23B 51/08 |
| 2020/0180043 | A1 * | 6/2020 | Yeo ....................... | F16D 1/0847 |
| 2020/0198020 | A1 | 6/2020 | Moerk et al. | |
| 2020/0254530 | A1 * | 8/2020 | Flottorp .............. | B23B 27/1611 |
| 2021/0394278 | A1 * | 12/2021 | Thabit ................... | B23B 29/046 |
| 2022/0111447 | A1 * | 4/2022 | Hecht ................. | B23B 27/1622 |
| 2022/0118527 | A1 * | 4/2022 | Hecht ........................ | F16B 2/18 |
| 2022/0193841 | A1 * | 6/2022 | Kimmich ................ | B23B 29/04 |
| 2022/0250172 | A1 * | 8/2022 | Lee ............................ | B23C 5/10 |
| 2023/0219145 | A1 * | 7/2023 | Suzuki .................... | B23B 27/14 |
| | | | | 407/30 |
| 2024/0293872 | A1 * | 9/2024 | Miyazawa .......... | B23B 27/1603 |
| 2025/0144717 | A1 * | 5/2025 | Hecht ................. | B23B 27/1611 |

FOREIGN PATENT DOCUMENTS

| | | | | |
|---|---|---|---|---|
| EP | 3311942 A1 * | 4/2018 | .......... | B23B 31/103 |
| FR | 2495978 A * | 12/1980 | | |
| JP | H02 78205 U | 6/1990 | | |

OTHER PUBLICATIONS

Written Opinion dated May 24, 2024, issued in PCT counterpart application No. PCT/IL2024/050212.

* cited by examiner

CUTTING HEAD HAVING ROTATIONALLY ASYMMETRIC COUPLING PIN, TOOL SHANK AND CUTTING TOOL

FIELD OF THE INVENTION

The subject matter of the present application relates to cutting tools having two releasably attached parts, namely a cutting head, having a cutting insert releasably attached thereto, and a tool shank, in particular to where one of the parts has a coupling pin, and further in particular to where the two parts are releasably attached together by a fastening member acting on the coupling pin.

BACKGROUND OF THE INVENTION

Cutting tools can be provided with a coupling mechanism for securely attaching a cutting head, having a cutting insert releasably attached thereto, to a tool shank. Typically, such a coupling mechanism includes a coupling pin that can be received into a pin receptacle. Moreover, in order to securely attach the cutting head to the tool shank, the cutting tool can include a fastening member for acting on the coupling pin. An example of such a cutting tool is disclosed in, for example, US 2020/198020 which discloses a tool holder with a tool holder body on which a tool mount, for securing a tool, is formed and on which a tool holder interface, for fixating the tool holder to a holder shaft, is formed. The tool holder interface includes a tool holder cone section, which is polygonal in a cross-section and which can engage with a correspondingly polygonal holder shaft cone section to establish a defined relative position in tangential direction between the tool mount and the holder shaft, and a tool holder cylinder section which can act together with a corresponding holder shaft cylinder section.

In some such cutting tools, the coupling pin is non-cylindrical. An example of such a cutting tool is disclosed in, for example, DE102019111834 B4 which discloses an interchangeable head consisting of the insertion rod which is insertable into an insertion opening of a tool holder. The insertion opening has a corner profile or an oval profile and the insertion rod is designed to be form-fitting to the insertion opening.

It is an object of the subject matter of the present application to provide a new and improved coupling between a cutting head and a tool shank that is quick and easy to assemble, and also provides a secure attachment of the cutting head to the tool shank.

SUMMARY OF THE INVENTION

In accordance with a first aspect of the subject matter of the present application there is provided a cutting tool, having a tool central axis that defines opposite forward and rearward directions, the cutting tool including:

a cutting head comprising:
        a head peripheral surface extending circumferentially about the tool central axis and forming a boundary of a rearwardly facing first head end surface;
        a head axial abutment surface located on the first head end surface; and
        an insert pocket;
    a tool shank comprising:
        a shank peripheral surface extending circumferentially about the tool central axis and forming a boundary of a forwardly facing first shank end surface;

a shank axial abutment surface located on the first shank end surface; and
    a coupling pin projecting from one of the first head end surface and the first shank end surface, the coupling pin comprising:
        a pin outer peripheral surface extending about a pin central axis;
        a pin vertical axis which is perpendicular to, and intersects, the pin central axis to thereby define a pin vertical plane;
        a pin engagement groove recessed in the pin outer peripheral surface and extending from a pin free end towards a pin fixed end along a groove longitudinal axis; and
        a clamping recess recessed in the pin outer peripheral surface opposite the pin engagement groove about the pin central axis;
    a pin receptacle recessed in the other of the first head end surface and the first shank end surface, the pin receptacle comprising:
        a receptacle inner peripheral surface extending about a receptacle central axis;
        a receptacle vertical axis which is perpendicular to, and intersects, the receptacle central axis to thereby define a receptacle vertical plane; and
        a receptacle engagement ridge protruding from the receptacle inner peripheral surface and extending from a receptacle open end towards a receptacle bottom end along a ridge longitudinal axis; and
    a clamping through bore formed in whichever one of the head peripheral surface and the shank peripheral surface the pin receptacle is recessed, and opening out to the pin receptacle at a receptacle through bore opening located opposite the receptacle engagement ridge about the receptacle central axis, wherein:
        the cutting tool is adjustable between a released position and a locked position, and in the locked position:
            the coupling pin is received into the pin receptacle; and
            a fastening member passes through the clamping through bore and acts on the clamping recess of the coupling pin, so that:
                the pin engagement groove abuts the receptacle engagement ridge;
                the head axial abutment surface abuts the shank axial abutment surface; and
        the cutting head and tool shank are releasably attached together.

In accordance with a second aspect of the subject matter of the present application there is provided a cutting head, having a head central axis that defines opposite forward and rearward directions, the cutting head comprising:

a head peripheral surface extending circumferentially about the head central axis and forming a boundary of a rearwardly facing first head end surface;
    a head axial abutment surface located on the first head end surface;
    an insert pocket; and
    either:
        a coupling pin projecting from the first head end surface, the coupling pin comprising:
            a pin outer peripheral surface extending about a pin central axis;
            a pin vertical axis which is perpendicular to, and intersects, the pin central axis to thereby define a pin vertical plane; and a pin engagement groove recessed in the pin outer peripheral surface and extending from a pin free end towards a pin fixed end along a groove longitudinal axis; and a clamping recess recessed in the pin outer peripheral surface opposite the pin engagement groove about the pin central axis;

or;

a pin receptacle recessed the first head end surface, the pin receptacle comprising:

a receptacle inner peripheral surface extending about a receptacle central axis;

a receptacle vertical axis which is perpendicular to, and intersects, the receptacle central axis to thereby define a receptacle vertical plane; and a receptacle engagement ridge protruding from the receptacle inner peripheral surface and extending from a receptacle open end towards a receptacle bottom end along a ridge longitudinal axis; and a clamping through bore recessed in the head peripheral surface and opening out to the pin receptacle at a receptacle through bore opening located opposite the receptacle engagement ridge about the receptacle central axis.

In accordance with a third aspect this aspect of the subject matter of the present application there is provided a tool shank, having a shank central axis that defines opposite forward and rearward directions, the tool shank comprising:

a shank peripheral surface extending circumferentially about the shank central axis and forming a boundary of a forwardly facing first shank end surface;

a shank axial abutment surface located on the first shank end surface; and either:

a coupling pin projecting from the first shank end surface, the coupling pin comprising:

a pin outer peripheral surface extending about a pin central axis;

a pin vertical axis which is perpendicular to, and intersects, the pin central axis to thereby define a pin vertical plane; and a pin engagement groove recessed in the pin outer peripheral surface and extending from a pin free end towards a pin fixed end along a groove longitudinal axis; and a clamping recess recessed in the outer pin peripheral surface opposite the pin engagement groove about the pin central axis;

or;

a pin receptacle recessed in the first shank end surface, the pin receptacle comprising:

a receptacle inner peripheral surface extending about a receptacle central axis;

a receptacle vertical axis which is perpendicular to, and intersects, the receptacle central axis to thereby define a receptacle vertical plane; and a receptacle engagement ridge protruding from the receptacle inner peripheral surface and extending from a receptacle open end towards a receptacle bottom end along a ridge longitudinal axis; and a clamping through bore recessed in the shank peripheral surface and opening out to the pin receptacle at a receptacle through bore opening located opposite the receptacle engagement ridge about the receptacle central axis.

It is understood that the above-said is a summary, and that features described hereinafter may be applicable in any combination to the subject matter of the present application, for example, any of the following features may be applicable to the cutting head, tool shank or the cutting tool:

The coupling pin can project from the first head end surface. The pin receptacle can be recessed in the first shank end surface. The clamping through bore can be formed in the shank peripheral surface.

The pin engagement groove can comprise a groove concavely curved portion extending along the groove longitudinal axis. The receptacle engagement ridge can comprise a ridge convexly curved portion extending along the along the ridge longitudinal axis. In the locked position, the groove concavely curved portion can abut the ridge convexly curved portion.

The cutting tool can comprise a single centrally disposed coupling pin and a single centrally disposed pin receptacle.

The cutting tool can comprise exactly one fastening member and exactly one clamping through bore for securing the cutting head to the tool shank. The coupling pin can comprise exactly one clamping recess.

The clamping through bore can comprise an internal threaded portion. The fastening member can comprise an external threaded portion. In the locked position, the external threaded portion can be threadingly engaged with the internal threaded portion.

The cutting tool can comprise a supplementary clamping screw. The cutting head can comprise a head clamping through bore recessed in the second head end surface and opening out to the first head end surface. The tool shank can comprise a shank clamping threaded bore recessed in the first shank end surface. In the locked position, the supplementary clamping screw can be located in the head clamping through bore and threadingly engaged with the shank clamping threaded bore.

The cutting head and the tool shank can have the same hardness.

The coupling pin can project from the first shank end surface. The pin receptacle can be recessed in the first head end surface. The clamping through bore can be formed in the head peripheral surface.

The coupling pin can project from the first head end surface.

The pin vertical plane can intersect the pin engagement groove. The pin engagement groove can exhibit mirror asymmetry about the pin vertical plane.

The pin engagement groove can comprise two opposing groove side surfaces which slope inwardly in opposite widthwise directions of the pin engagement groove, so that they converge towards each other.

The two groove side surfaces can intersect each other.

The pin engagement groove can comprise a groove concavely curved portion which extends along the groove longitudinal axis and connects the two groove side surfaces.

The groove concavely curved portion can be defined by a groove concave radius. The groove concave radius can be greater than or equal to 2.8 mm and less than or equal to 3.6 mm.

The pin engagement groove can have a groove depth. The groove depth can be greater than or equal to 0.3 mm and less than or equal to 0.7 mm.

The groove depth can be constant along the groove longitudinal axis.

The pin engagement groove can have a groove width. The groove width can be greater than or equal to 5.0 mm and less than or equal to 5.84 mm.

The groove width can be constant along the groove longitudinal axis.

The pin engagement groove can extend lengthwise along an entire axial extent of the coupling pin.

The groove longitudinal axis can be parallel to the pin central axis.

The cutting head can further comprise a head coolant channel having a head coolant channel inlet and a head coolant channel outlet. The coupling pin can comprise a pin rear surface bounded by the pin outer peripheral surface. The head coolant channel inlet can be located on the pin rear surface.

The pin engagement groove can extend to the pin rear surface.

The cutting head can further comprise a second head end surface opposite the first head end surface. The cutting head can further comprise a head clamping through bore recessed in the second head end surface and opening out to the first head end surface.

The pin outer peripheral surface can comprise opposing pin upper and lower surfaces and two opposing pin side surfaces which connect the pin upper and lower surfaces. The clamping recess can be located on the pin upper surface. The clamping recess can comprise a clamping recess abutment surface which slopes towards a pin median plane containing the pin central axis and extending through the two opposing pin side surfaces, in a direction towards the first head end surface.

The clamping recess abutment surface can form a recess sloping angle with the pin upper surface. The recess sloping angle can be greater than or equal to 6° and less than or equal to 10°.

The insert pocket can comprise a pocket seat surface configured to seat a cutting insert, the pocket seat surface facing in the same direction as the pin upper surface.

The pin receptacle can be recessed in the first shank end surface. The clamping through bore can be formed in the shank peripheral surface.

The receptacle vertical plane can intersect the receptacle engagement ridge. The receptacle engagement ridge can exhibit mirror asymmetry about the receptacle vertical plane.

The receptacle engagement ridge can comprise two opposing ridge side surfaces which slope inwardly in opposite widthwise directions of the receptacle engagement ridge, so that they converge towards each other.

The two ridge side surfaces can intersect each other.

The receptacle engagement ridge can comprise a ridge convexly curved portion which extends along the along the ridge longitudinal axis and connects the two ridge side surfaces.

The ridge convexly curved portion can be defined by a ridge convex radius. The ridge convex radius can be greater than or equal to 2.8 mm and less than or equal to 3.6 mm.

The receptacle engagement ridge can have a ridge height. The ridge height can be greater than or equal to 0.3 mm and less than or equal to 0.7 mm.

The ridge height can be constant along the ridge longitudinal axis.

The receptacle engagement ridge can have a ridge width. The ridge width can be greater than or equal to 5.0 mm and less than or equal to 5.84 mm.

The ridge width can be constant along the ridge longitudinal axis.

The receptacle engagement ridge can extend lengthwise along an entire axial extent of the pin receptacle.

The ridge longitudinal axis can be parallel to the receptacle central axis.

The tool shank can comprise a shank coolant channel having a shank coolant channel inlet and a shank coolant channel outlet. The pin receptacle can comprise a receptacle rear surface bounded by the receptacle inner peripheral surface. The shank coolant channel outlet can be located on the receptacle rear surface.

The tool shank can comprise a shank clamping threaded bore recessed in the first shank end surface.

The clamping through bore can slant away from the first shank end surface in a direction from the shank peripheral surface to the receptacle through bore opening.

The clamping through bore can slant at a bore sloping angle with respect to the receptacle vertical axis. The bore sloping angle can be greater than or equal to 6° and less than or equal to 10°.

The receptacle engagement ridge can extend to the first shank end surface.

The clamping through bore can comprises an internal threaded portion.

BRIEF DESCRIPTION OF THE FIGURES

For a better understanding of the present application and to show how the same may be carried out in practice, reference will now be made to the accompanying drawings, in which.

Figures 1, 2:
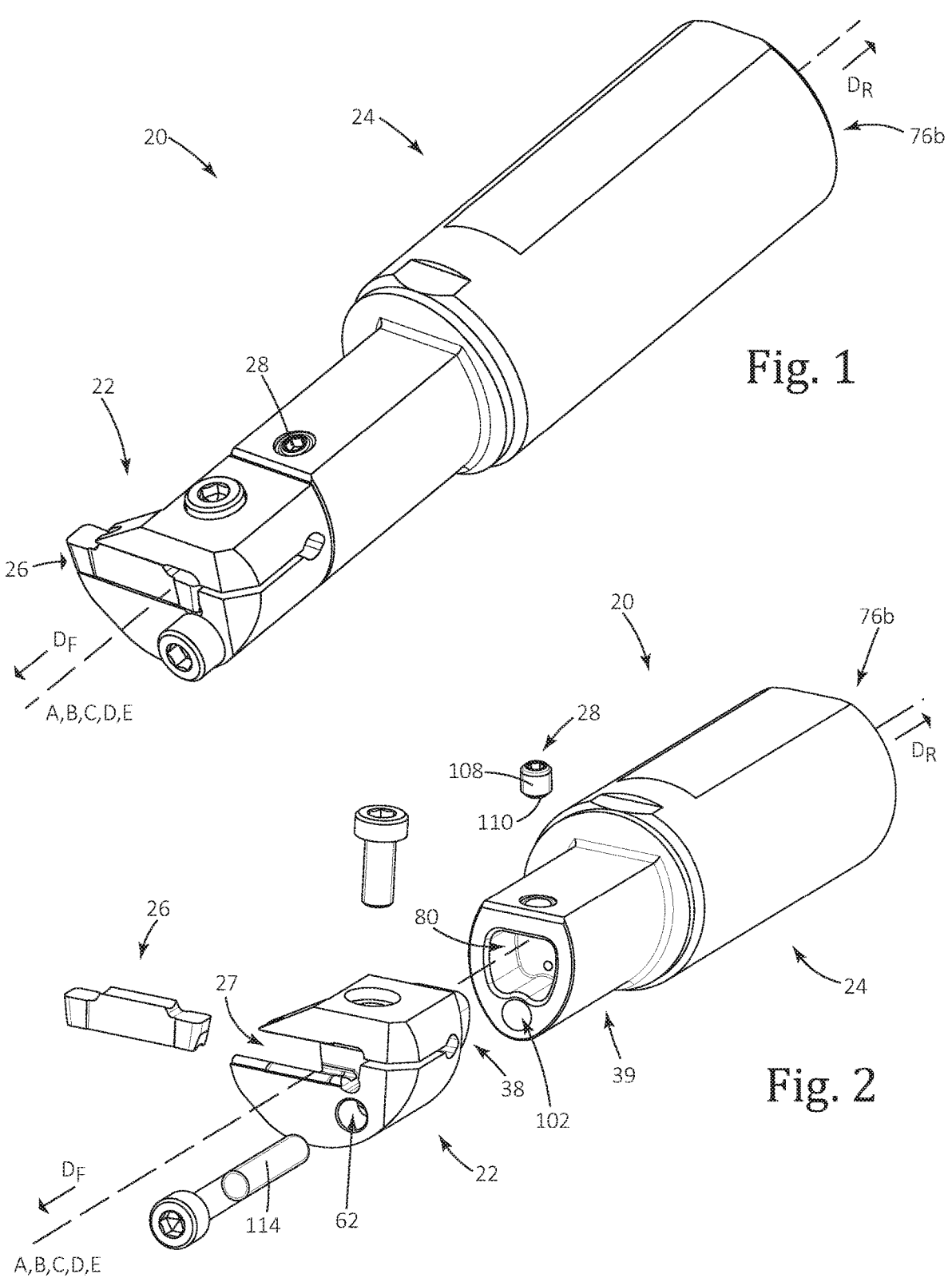
FIG. 1 is a perspective view of a cutting tool in accordance with a first embodiment of the present application.
FIG. 2 is an exploded perspective view of the cutting tool shown in FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIGS. 1 and 2 showing a cutting tool 20, 120 of the type used for turning operations, in accordance with embodiments of the subject matter of the present application. In this non-limiting example shown in the drawings, the cutting tool 20, 120 is a grooving tool for cutting internal grooves. The cutting tool 20, 120 has a tool central axis A that defines opposite forward and rearward directions $D_F$, $D_R$.

Figure 8:
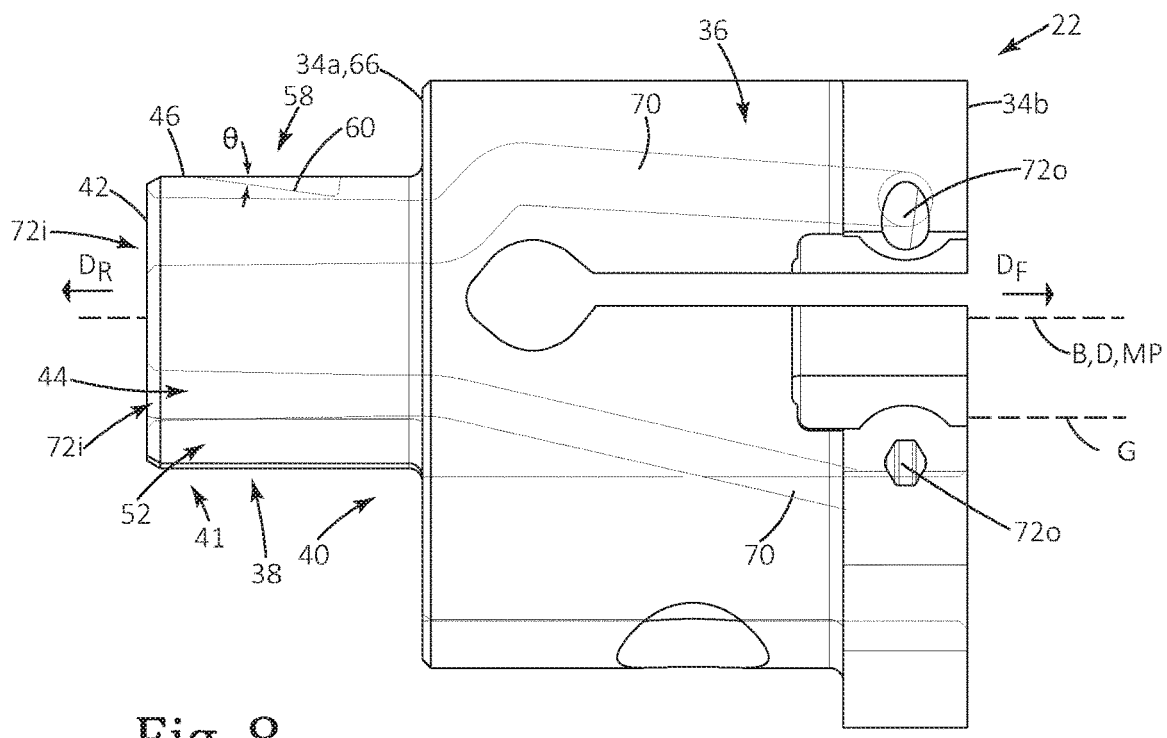
FIG. 8 is a side view of the cutting head shown in FIG. 3, showing the hidden clamping recess head clamping through bore and head coolant channel.

It should be appreciated that use of the terms "forward" and "rearward" throughout the description and claims refer to a relative position in a direction of the tool central axis A towards the right and left, respectively, in FIG. 8.

The cutting tool 20, 120 includes two parts, namely, a cutting head 22, 122 and a complementary tool shank 24, 124 releasably attachable thereto. Both said parts can typically be made from the same material, e.g., steel. Thus, both parts can have the same hardness. A cutting insert 26 is releasably attached to the cutting head 22, 122 in an insert pocket 27. The cutting tool 20, 120 is thus modular. In this non-limiting example shown in the drawings, the cutting tool 20, 120 includes a single cutting insert 26. However, the cutting tool 20, 120 can have a plurality of cutting inserts. Each cutting insert 26 can be typically made from cemented carbide and is attached in the insert pocket 27 which can be located at a forward end of the cutting head 22, 122. The cutting tool 20, 120 is adjustable between a released and locked position. In the locked position of the cutting tool 20, 120, the cutting head 22, 122 is releasably attached to the tool shank 24, 124, by a fastening member 28.

Figure 3:
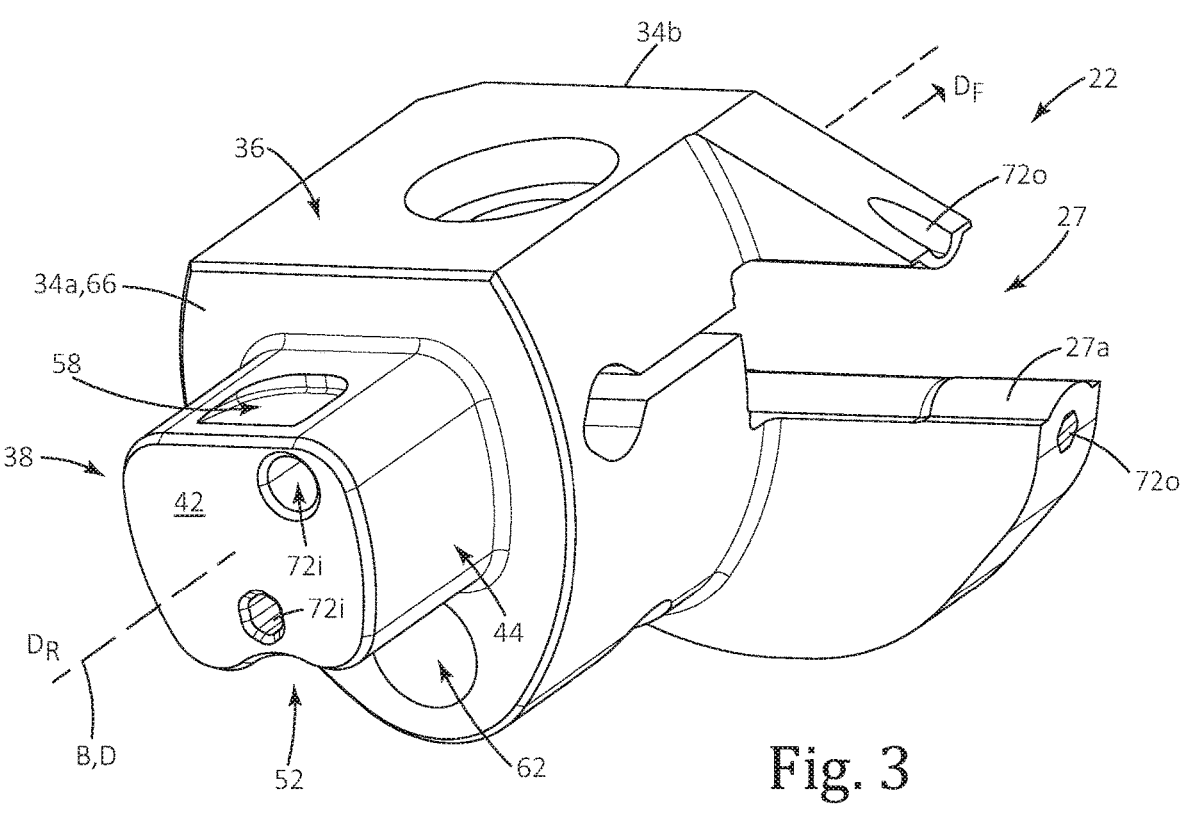
FIG. 3 is a perspective view of a cutting head shown in FIGS. 1 and 2.
Figure 17:
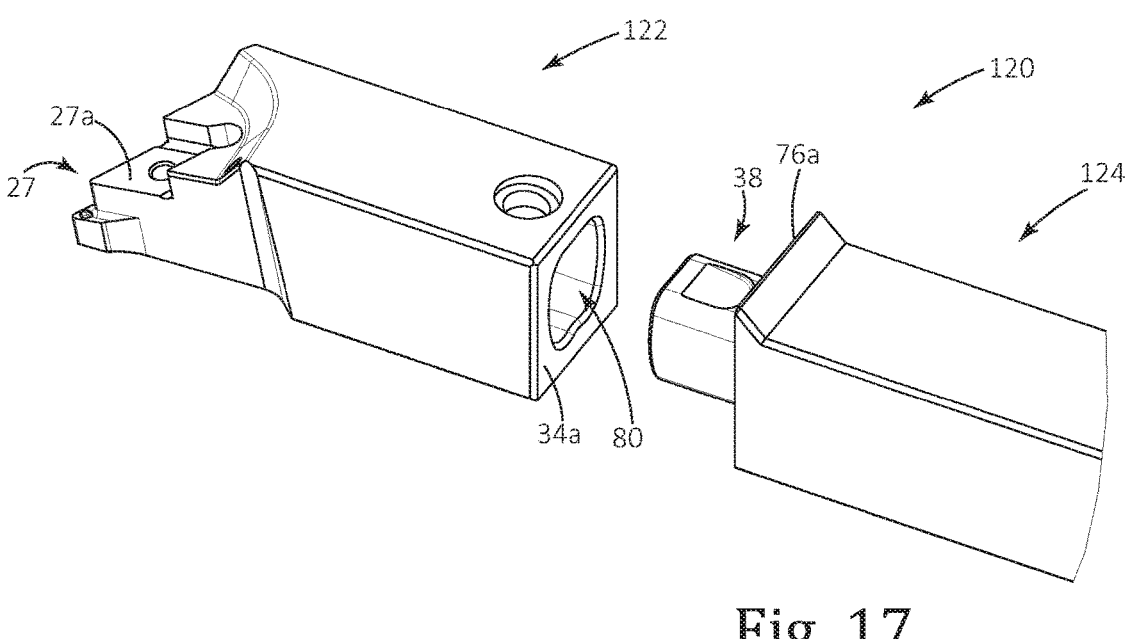
FIG. 17 is an exploded view of the rotary cutting tool in accordance with a second embodiment of the present application.

Referring to FIG. 3 in particular, the insert pocket 27 includes a pocket seat surface 27a configured to seat the cutting insert 26. In the non-limiting example shown in FIGS. 1-4, the insert pocket 27 is in the form of a slot having a resilient upper arm for clamping the cutting insert. However, as seen in FIG. 17, showing a turning tool, the insert pocket 27 can be a typical pocket for turning, where the cutting insert 26 is clamping by a fastening screw (not shown).

Referring to FIGS. 3 to 8, the cutting head 22, 122 includes opposite first and second head end surfaces 34a, 34b and a head peripheral surface 36 that extends therebetween. The first head end surface 34a faces in the rearward direction $D_F$ and is thus rearwardly facing. The head peripheral surface 36 extends circumferentially about the tool central axis A and forms a boundary of the first and second head end surfaces 34a, 34b. The tool central axis A intersects the first and second head end surfaces 34a, 34b. The cutting head 22, 122 has its own head central axis B, that is co-incident (i.e., aligned) with the tool central axis A when the cutting tool 20, 120 is in the locked position.

In accordance with some embodiments of the subject matter of the present application, the cutting head 22, 122 can be additively manufactured. The cutting head 22, 122 can be integrally formed to have unitary one-piece construction. It should be noted that use of the term "additively manufactured" throughout the description and claims refers to refers to processes used to create a three-dimensional object in which layers of material are formed to create an object. Examples of such processes include, but are not limited to, Selective Laser Melting (SLM), Selective Laser Sintering (SLS), Direct Metal Laser Sintering (DMLS), Fused Deposition Modeling (FDM) and 3D Printing.

Referring to FIGS. 9 to 13, the tool shank 24, 124 includes opposite first and second shank end surfaces 76a, 76b and a shank peripheral surface 78 that extends therebetween. The first shank end surface 76a faces in the forward direction $D_F$ and is thus forwardly facing. The shank peripheral surface 78 extends circumferentially about the tool central axis A, and forms a boundary of the first and second shank end surfaces 76a, 76b. The tool central axis A intersects the first and second shank end surfaces 76a, 76b. The tool shank 24, 124 has its own shank central axis C, that is co-incident (i.e., aligned) with the tool central axis A when the cutting tool 20, 120 is in the locked position.

As best seen in FIG. 3, the cutting tool 20, 120 includes a coupling pin 38 which extends along a pin central axis D. The coupling pin 38 projects from one of the first head end surface 34a and the first shank end surface 76a. In accordance with the first embodiment of the subject matter of the present application (i.e., FIG. 2), the coupling pin 38 can project from the first head end surface 34a. Alternatively, in accordance with the second embodiment of the subject matter of the present application (i.e., FIG. 17), the coupling pin 38 can project from the first shank end surface 76a. The coupling pin 38 has a pin fixed end 40 (from which the coupling pin 38 is fixed to whichever one of the first head end surface 34a and the first shank end surface 76a the coupling pin 38 projects) and a pin free end 41 axially opposite to the pin fixed end 40.

The purpose of the coupling pin 38 is two-fold. Firstly, to position the cutting head 22, 122 in a precise predetermined position relative to the tool shank 24, 124. Secondly, to provide a coupling means between the cutting head 22, 122 and the tool shank 24, 124. The coupling pin 38 includes a pin outer peripheral surface 44 which extends about the pin central axis D.

Figure 4:
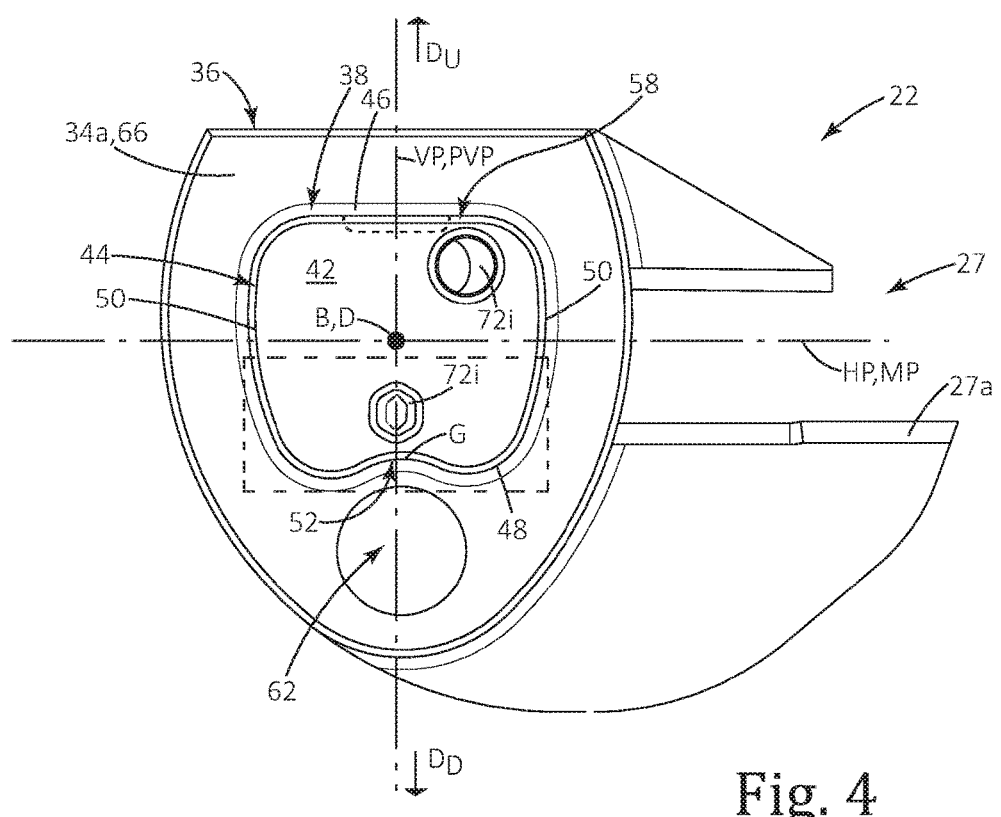
FIG. 4 is a rearward view of the cutting head shown in FIG. 3, showing a hidden clamping recess.

As seen from FIGS. 3 and 4, the coupling pin 38 has a non-cylindrical cross-sectional shape along the majority of its length along the pin central axis D. As such, the pin outer peripheral surface 44 lacks a helical thread extending in direction along the pin central axis D. and thus may be considered a non-threaded pin outer peripheral surface 44.

In accordance with some embodiments of the subject matter of the present application, the pin outer peripheral surface 44 may not be tapered. That is to say, the pin outer peripheral surface 44 may not slope towards (or away from) the pin central axis D in the rearward direction $D_R$. The coupling pin 38 can include a pin rear surface 42 that is spaced apart from the first head end surface 34a by the pin outer peripheral surface 44. That is to say, the pin outer peripheral surface 44 can extend between the pin rear surface 42 and the first head end surface 34a. The pin rear surface 42 can be bounded by the pin outer peripheral surface 44. The pin central axis D can intersect the pin rear surface 42. The cutting tool 20, 120 can include a single coupling pin 38 that can be centrally disposed (i.e., the coupling pin 38 can extend along the head central axis B). The pin central axis D can be co-incident with the head central axis B.

Referring to FIG. 4, in accordance with some embodiments of the subject matter of the present application, the pin outer peripheral surface 44 includes opposing pin upper and lower surfaces 46, 48 and two opposing pin side surfaces 50 which connect the pin upper and lower surfaces 46, 48. In accordance with some embodiments of the subject matter of the present application, the pin upper surface 46 can be planar. The two pin side surfaces 50 can be convexly curved.

The coupling pin 38 includes a pin vertical axis VP which is perpendicular to the pin central axis D and intersects the pin central axis D, and also intersects the pin upper and lower surfaces 46, 48. The pin vertical axis VP defines opposing upward and downward directions $D_U$, $D_D$. The coupling pin 38 includes a pin horizontal axis HP which intersects the pin central axis D and also the two pin side surfaces 50. The pin central axis D, the pin vertical axis VP and the pin horizontal axis HP are mutually perpendicular to each other. The coupling pin 38 has a pin median plane MP which contains the pin central axis D and the pin horizontal axis HP, and extends through (i.e., intersects) the two pin side surfaces 50. The coupling pin 38 has a pin vertical plane PVP which contains the pin central axis D and the pin vertical axis VP and thus is defined by their intersection, and extends through (i.e., intersects) the pin upper and lower surfaces 46, 48.

It should be appreciated that use of the terms "upward" and "downward" throughout the description and claims refer to a relative position in a direction of the pin vertical axis VP, upwardly and downwardly, respectively, in FIG. 4.

Referring to FIGS. 3 and 4, the coupling pin 38 includes a pin engagement groove 52 recessed in the pin outer peripheral surface 44. Specifically, the pin engagement groove 52 is located on the pin lower surface 48. The pin engagement groove 52 extends from the pin free end 41 towards the pin fixed end 40. The pin engagement groove 52 extends along a groove longitudinal axis G. The pin engagement groove 52 is formed between two pin ridges 53. In accordance with some embodiments of the subject matter of the present application, the groove longitudinal axis G can be parallel to the pin central axis D. In some embodiments, the pin vertical plane PVP may contain both the groove longitudinal axis G and the pin central axis D.

The pin engagement groove 52 can extend linearly along the groove longitudinal axis G. The pin engagement groove 52 may have a U-shaped cross-section in a plane perpendicular to the groove longitudinal axis G and/or the pin central axis D. The pin engagement groove 52 can extend to (i.e., intersect) the pin rear surface 41.

Figure 4A:
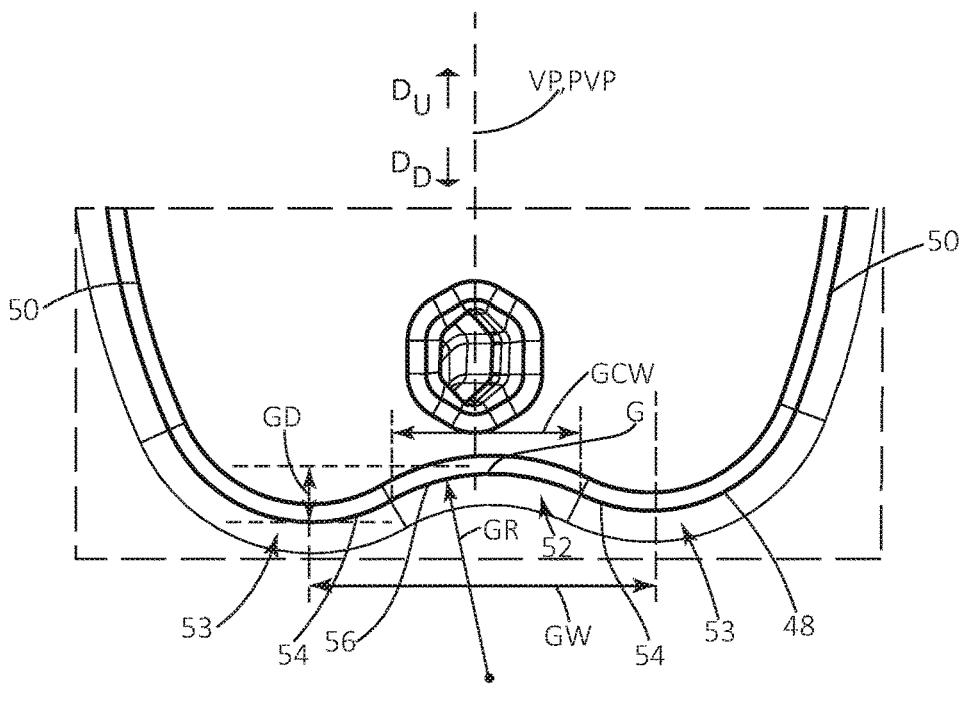
FIG. 4A is a detail of FIG. 4.
Figure 5:
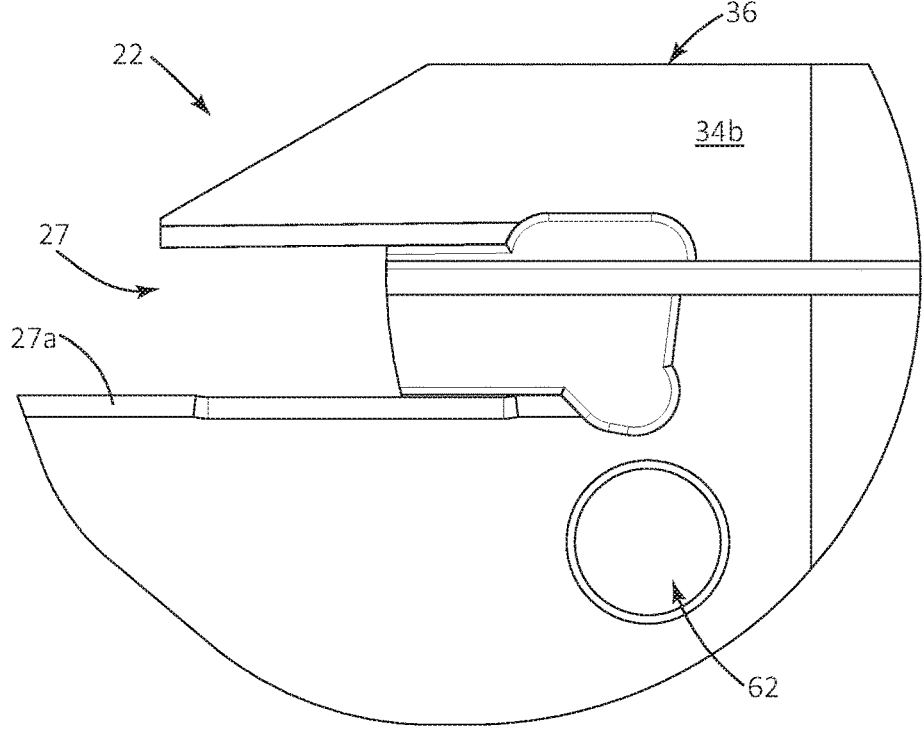
FIG. 5 is a forward view of the cutting head shown in FIG. 3.

Referring to FIG. 4A, the two pin ridges 53 can have different heights (i.e., extend in the downward direction $D_D$ to different positions). Alternatively, in some embodiments, the two pin ridges 53 may have dissimilar shapes and/or circumferential lengths. The pin engagement groove 52, and thus the coupling pin 38 itself, can exhibit mirror asymmetry about the pin vertical plane PVP. The groove longitudinal axis G can be offset from (i.e., not contained in), and parallel to, the pin vertical plane PVP.

Making reference to FIG. 4A, in accordance with some embodiments of the subject matter of the present application, the pin engagement groove 52 can include two opposing groove side surfaces 54 which slope inwardly (i.e., towards the pin central axis D) in opposite widthwise directions of the pin engagement groove 52, so that they converge towards each other. The two groove side surfaces 54 can intersect each other. The groove longitudinal axis G can be defined by the intersection of the two groove side surfaces 54.

In accordance with some embodiments of the subject matter of the present application, the pin engagement groove 52 can include a groove concavely curved portion 56. The groove concavely curved portion 56 can connect the two groove side surfaces 54. The groove concavely curved portion 56 can extend along the groove longitudinal axis G. The groove concavely curved portion 56 contains the lowest point on the pin engagement groove 52.

In accordance with some embodiments of the subject matter of the present application, the coupling pin 38 can have a basic kidney-shaped profile in a forward view of the cutting head 22, 122 (i.e., FIG. 4). It is noted that the coupling pin 38 can only exhibit 360° rotational symmetry about the pin central axis D. Thus, the coupling pin 38 is considered to be "rotationally asymmetric" about the pin central axis D.

Referring again to FIG. 4A, the groove concavely curved portion 56 can be defined by a groove concave radius GR. The groove concave radius GR can fulfil the condition: 2.8 mm≤GR≤3.6 mm. Preferably, the groove concave radius GR can be equal to 3.2 mm.

The groove concavely curved portion 56 has a concave portion width GCW. The concave portion width GCW is measured along the groove horizontal axis HG. In accordance with some embodiments of the subject matter of the present application, the concave portion width GCW can fulfil the condition: 2.84 mm≤GCW≤3.24 mm. Preferably, the concave portion width GCW can be equal to 3.04 mm. The concave portion width GCW can be constant along the groove longitudinal axis G.

The pin engagement groove 52 has a groove depth GD. The groove depth GD is measured along the pin vertical axis VP (between the pin engagement groove's closest and furthest points from the pin median plane MP). In accordance with some embodiments of the subject matter of the present application, the groove depth GD can fulfil the condition: 0.3 mm≤GD≤0.7 mm. Preferably, the groove depth GD can fulfil the condition: 0.4 mm≤GD≤0.6 mm. Further preferably, the groove depth GD can be equal to 0.5 mm. The groove depth GD can be constant along the groove longitudinal axis G.

The pin engagement groove 52 has a groove width GW. The groove width GW is measured along the pin horizontal axis HP (between the pin engagement groove's furthest points on each side of the pin vertical plane PVP). In accordance with some embodiments of the subject matter of the present application, the groove width GW can fulfil the condition: 5.0 mm≤GW≤5.84 mm. Preferably, the groove width GW can be equal to 5.42 mm. The groove width GW can be constant along the groove longitudinal axis G. The groove width GW can be greater than the concave portion width GCW.

Figure 7:
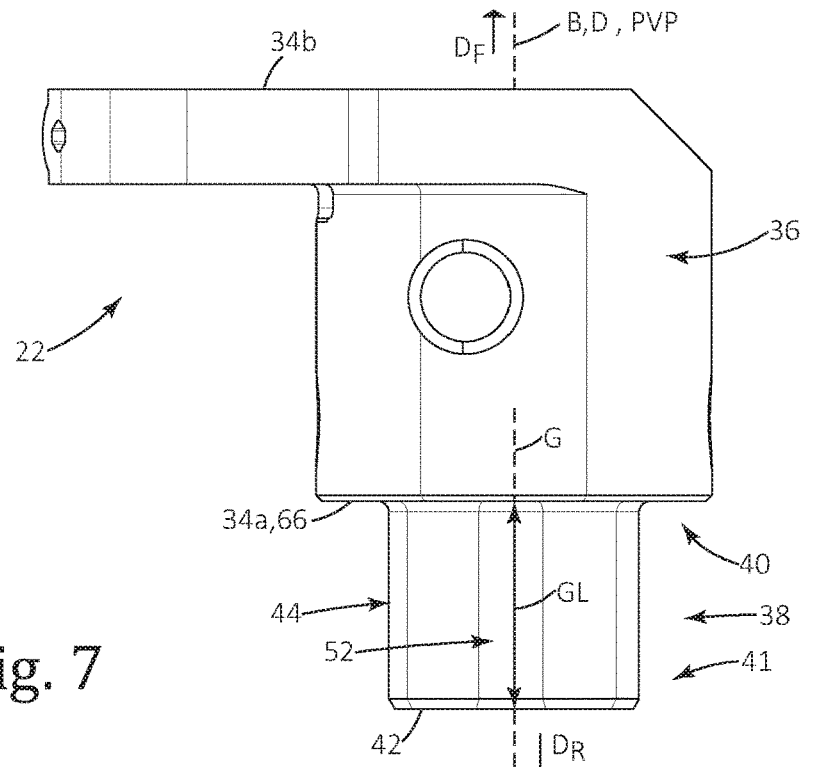
FIG. 7 is a bottom view of the cutting head shown in FIG. 3.

Referring to FIG. 7, the pin engagement groove 52 has a groove length GL. The groove length GL is measured along the pin central axis D. In accordance with some embodiments of the subject matter of the present application, the pin engagement groove 52 can extend lengthwise along an entire axial extent of the coupling pin 38.

Figure 6:
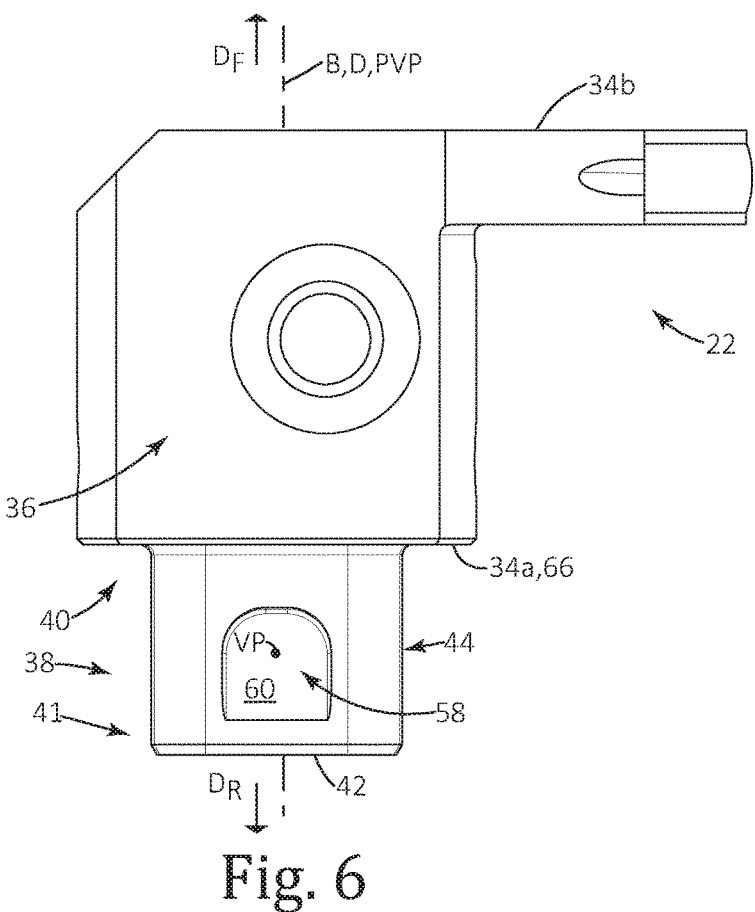
FIG. 6 is a top view of the cutting head shown in FIG. 3.

As seen in FIG. 6, the pin outer peripheral surface 44 includes a clamping recess 58. Stated differently, the clamping recess 58 is peripherally disposed on the coupling pin 38. Specifically, the clamping recess 58 is located on the pin upper surface 46. The clamping recess 58 is designed for receiving a portion of the fastening member 28. As seen in FIGS. 3 and 4, the clamping recess 58 is located opposite the pin engagement groove 52 about the pin central axis D. Thus, in accordance with some embodiments of the subject matter of the present application, the pin vertical plane PVP can intersect the clamping recess 58 and the pin engagement groove 52. The pin upper surface 46 (upon which the clamping recess 58 is located) can face in the same direction as pocket seat surface 27a.

Referring to FIG. 8, in accordance with some embodiments of the subject matter of the present application, the coupling pin 38 can include exactly one clamping recess 58. The clamping recess 58 can be spaced apart from the pin rear surface 42. Likewise, the clamping recess 58 can be spaced apart from the first head end surface 34a. The clamping recess 58 can include a clamping recess abutment surface 60 for contact with the fastening member 28. The clamping recess abutment surface 60 can be planar. The clamping recess abutment surface 60 can slope towards the pin median plane MP in a direction towards the first head end surface 34a. The clamping recess abutment surface 60 can form a recess sloping angle θ with the pin upper surface 46. The recess sloping angle θ can be greater than or equal to 6° and less than or equal to 10°. Preferably the recess sloping angle θ can be equal to 8°. Thus, the clamping recess 58 can be shallow and does not unduly reduce the overall strength of the coupling pin 38.

As seen in FIGS. 6 and 7, the cutting head 22, 122 includes a head axial abutment surface 66 located on the first head end surface 34a. The head axial abutment surface 66 is for abutting a corresponding surface on the tool shank 24, 124. In accordance with some embodiments of the subject matter of the present application, the head axial abutment surface 66 can extend radially outwardly to the head peripheral surface 36. The head axial abutment surface 66 can be planar and extend perpendicularly to the head central axis B.

In accordance with some embodiments of the subject matter of the present application, the cutting head 22, 122 can include a head clamping through bore 62 recessed in the second head end surface 34b and opening out to the first head end surface 34a. The head clamping through bore 62 is designed to receive a clamping screw for supplementary clamping, as described later in the description. As best seen in FIG. 4, the pin engagement groove 52 allows the diameter of the head clamping through bore 62 to be larger than would be permitted if there was no groove and the coupling pin extending further downwards (i.e., in a direction away from the pin median plane MP).

Referring to FIG. 8, in accordance with some embodiments of the subject matter of the present application, the cutting head 22, 122 can include a head coolant channel 70. The head coolant channel 70 has a head coolant channel inlet 72i and a head coolant channel outlet 720. The head coolant channel outlet 720 is in fluid communication with the head coolant channel inlet 72i through the head coolant channel 70. The head coolant channel outlet 720 is located so as to direct coolant towards a cutting region. The head coolant channel inlet 72i can be located on the pin rear surface 42. In this non-limiting example shown in the drawings, the cutting head 22, 122 includes two head coolant channels 70.

As best seen in FIGS. 9 to 13, the cutting tool 20, 120 includes a pin receptacle 80 which extends along a receptacle central axis E. The pin receptacle 80 is recessed in the other of the first head end surface 34a and the first shank end surface 76a (i.e., recessed in the first head end surface 34a or the first shank end surface 76a from which the coupling pin 38 does not project). In accordance with the first embodiment of the subject matter of the present application, the pin receptacle 80 can be recessed in the first shank end surface 76a. As seen in the figures, in the first embodiment, the pin receptacle 80 may be recessed in a shank protrusion 39 which protrudes in the forward direction D_F from a shank axial abutment surface 104 located on the first shank end surface 76a. Alternatively, in accordance with the second embodiment of the subject matter of the present application, the pin receptacle 80 can be recessed in the first head end surface 34a.

Figure 13:
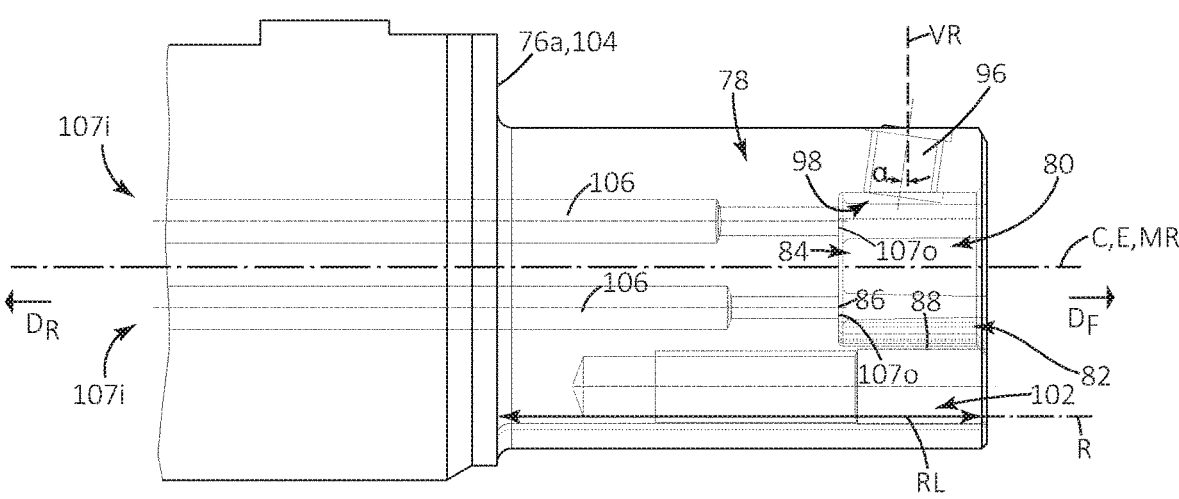
FIG. 13 is a side view of the forward end of the tool shank shown in FIG. 9, showing a hidden clamping through bore, shank clamping threaded bore and shank coolant channel.

Making reference to FIG. 13, the pin receptacle 80 includes a receptacle open end 82 (which opens out to whichever one of the first head end surface 34a and the first shank end surface 76a the pin receptacle 80 is recessed) and a receptacle bottom end 84 axially opposite the receptacle open end 82. The pin receptacle 80 includes a receptacle inner peripheral surface 86 which extends about the receptacle central axis E. In the embodiment shown, the inner peripheral surface 86 lacks a helical inner thread extending in a direction along the receptacle central axis E and thus may be considered a non-threaded inner peripheral surface 86. In accordance with some embodiments of the subject matter of the present application, the pin receptacle 80 can include a receptacle rear surface 88 bounded by the receptacle inner peripheral surface 86. The receptacle central axis E can intersect the receptacle rear surface 88. The cutting tool 20, 120 can include a single pin receptacle 80 that can be centrally disposed (i.e., the pin receptacle 80 can extend along the shank central axis C). The receptacle central axis E can be co-incident with the shank central axis C.

Figure 12:
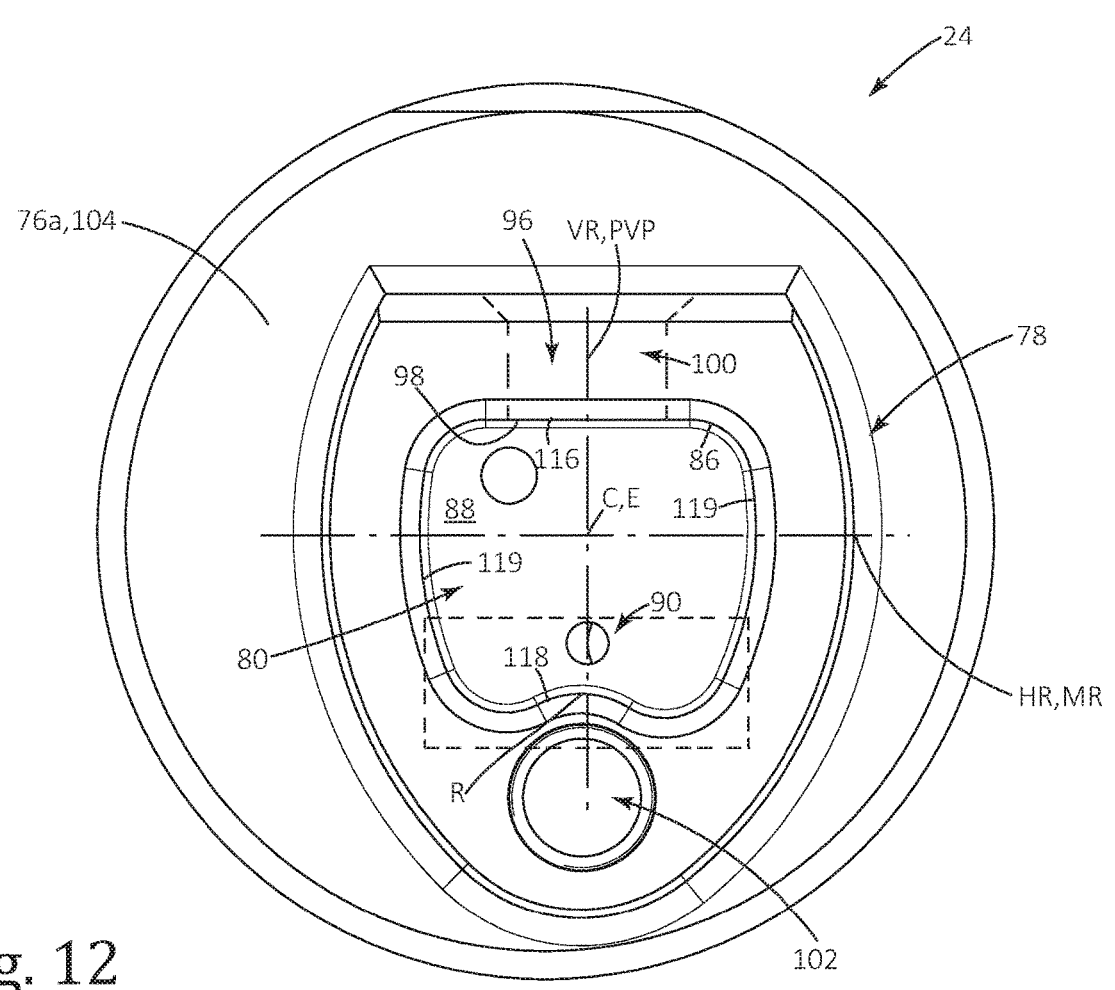
FIG. 12 is a forward view of the tool shank of FIG. 9.

Referring to FIG. 12, the receptacle inner peripheral surface 86 includes opposing receptacle upper and lower surfaces 116, 118 and two opposing receptacle side surfaces 119 which connect the receptacle upper and lower surfaces 116, 118. In accordance with some embodiments of the subject matter of the present application, the receptacle upper surface 116 can be planar. The two receptacle side surfaces 119 can be concavely curved.

The pin receptacle 80 includes a receptacle vertical axis VR which is perpendicular to the receptacle central axis E and intersects the receptacle central axis E, and also intersects the receptacle upper and lower surfaces 116, 118. The pin receptacle 80 includes a receptacle horizontal axis HR which intersects the receptacle central axis E and also the two receptacle side surfaces 119. The receptacle central axis E, the receptacle vertical axis VR and the receptacle horizontal axis HR are mutually perpendicular to each other. The pin receptacle 80 has a receptacle median plane MR which contains the receptacle central axis E and the receptacle horizontal axis HR, and extends through (i.e., intersects) the two receptacle side surfaces 119. The pin receptacle 80 has a receptacle vertical plane RVP which contains the receptacle central axis E and the receptacle vertical axis VR and thus is defined by their intersection. The receptacle vertical plane RVP extends through (i.e., intersects) the receptacle upper and lower surfaces 116, 118.

The pin receptacle 80 includes a receptacle engagement ridge 90 protruding from the receptacle inner peripheral surface 86. Specifically, the receptacle engagement ridge 90 is located on the receptacle lower surface 118. The receptacle engagement ridge 90 extends from the receptacle open end 82 towards the receptacle bottom end 84 along a ridge longitudinal axis R. The receptacle engagement ridge 90 is formed between two receptacle grooves 91. In accordance with some embodiments of the subject matter of the present application, the ridge longitudinal axis R can be parallel to the receptacle central axis E. In some embodiments, the receptacle vertical plane RVP may contain both the ridge longitudinal axis R and the receptacle central axis E as well as the receptacle vertical axis VR.

The receptacle engagement ridge 90 can extend linearly along the ridge longitudinal axis R. The receptacle engagement ridge 90 may have a U-shaped cross-section in a plane perpendicular to the ridge longitudinal axis R and/or the receptable central axis E. The receptacle engagement ridge 90 can extend to (i.e., intersect) the first shank end surface 76a.

Figure 12A:
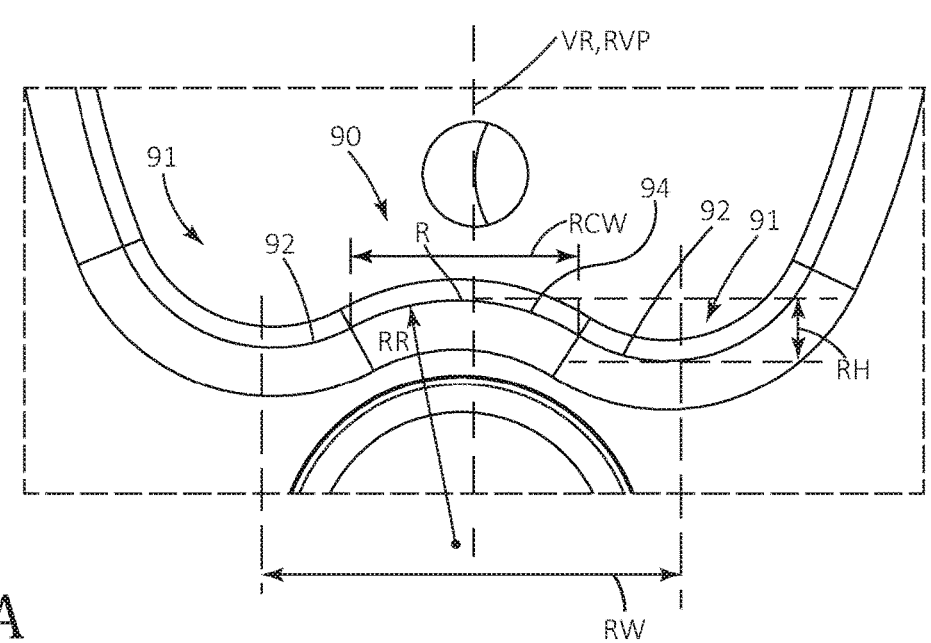
FIG. 12A is a detail of FIG. 12.

Referring to FIG. 12A, the two receptacle grooves 91 can have different depths (i.e., extend in the downward direction $D_D$ to different positions). Alternatively, in some embodiments, the two receptable grooves 91 may have dissimilar shapes and/or circumferential lengths. The receptacle engagement ridge 90, and thus the pin receptacle 80 itself, can exhibit mirror asymmetry about the receptacle vertical plane RVP. The ridge longitudinal axis R can be offset from (i.e., contained in), and parallel to, the receptacle vertical plane RVP.

Referring to FIG. 12, in accordance with some embodiments of the subject matter of the present application, the receptacle engagement ridge 90 can include two opposing ridge side surfaces 92 which slope inwardly (i.e., towards the receptacle central axis E) in opposite widthwise directions of the receptacle engagement ridge 90, so that they converge towards each other. The two ridge side surfaces 92 can intersect each other. The ridge longitudinal axis R can be defined by the intersection of the two ridge side surfaces 92.

In accordance with some embodiments of the subject matter of the present application, the receptacle engagement ridge 90 can include a ridge convexly curved portion 94. The ridge convexly curved portion 94 can connect the two ridge side surfaces 92. The ridge convexly curved portion 94 can extend along the ridge longitudinal axis R. The ridge convexly curved portion 94 contains the highest point on the receptacle engagement ridge 90.

In accordance with some embodiments of the subject matter of the present application, the pin receptacle 80 can have a basic shape that matches that of the coupling pin 38 (being at least a little smaller so as to allow free insertion therein). That is to say, the pin receptacle 80 can have kidney-shaped profile in a forward view of the tool shank 24, 124 (i.e., FIG. 12), and the pin receptacle 80 can thus only exhibit 360° rotational about the receptacle central axis E. Thus, the pin receptacle 80 is considered to be "rotationally asymmetric" about the pin central axis D.

Referring to FIG. 12A, the ridge convexly curved portion 94 can be defined by a ridge convex radius RR. The ridge convex radius RR can fulfil the condition: 2.8 mm≤RR≤3.6 mm. Preferably, the ridge convex radius RR can be equal to 3.2 mm. The ridge convex radius RR can have the same value as the groove concave radius GR.

The ridge convexly curved portion 94 has a convex portion width RCW. The convex portion width RCW is measured along the ridge horizontal axis HR. In accordance with some embodiments of the subject matter of the present application, the convex portion width RCW can fulfil the condition: 2.84 mm≤RCW≤3.24 mm. Preferably, the convex portion width RCW can be equal to 3.04 mm. The convex portion width CW can be constant along the ridge longitudinal axis R.

The receptacle engagement ridge 90 has a ridge height RH. The ridge height RH is measured along the pin vertical axis VP (between the receptacle engagement ridge's closest and furthest points from the receptacle median plane MR). In accordance with some embodiments of the subject matter of the present application, the ridge height RH can fulfil the condition: 0.3 mm≤RH≤0.7 mm. Preferably, the ridge height RH can fulfil the condition: 0.4 mm≤RH≤0.6 mm. Further preferably, the ridge height RH can be equal to 0.5 mm. The ridge height RR can be constant along the ridge longitudinal axis R.

The receptacle engagement ridge 90 has a ridge width RW. The ridge width RW is measured along the ridge horizontal axis HR (between the receptacle engagement ridge's furthest points on each side of the receptacle vertical plane RVP). In accordance with some embodiments of the subject matter of the present application, the ridge width RW can fulfil the condition: 5.0 mm≤RW≤5.84 mm. Preferably, the ridge width RW can be equal to 5.42 mm. The ridge width RW can be constant along the ridge longitudinal axis R. The ridge width RW can be greater than the convex portion width RCW.

Figure 9:
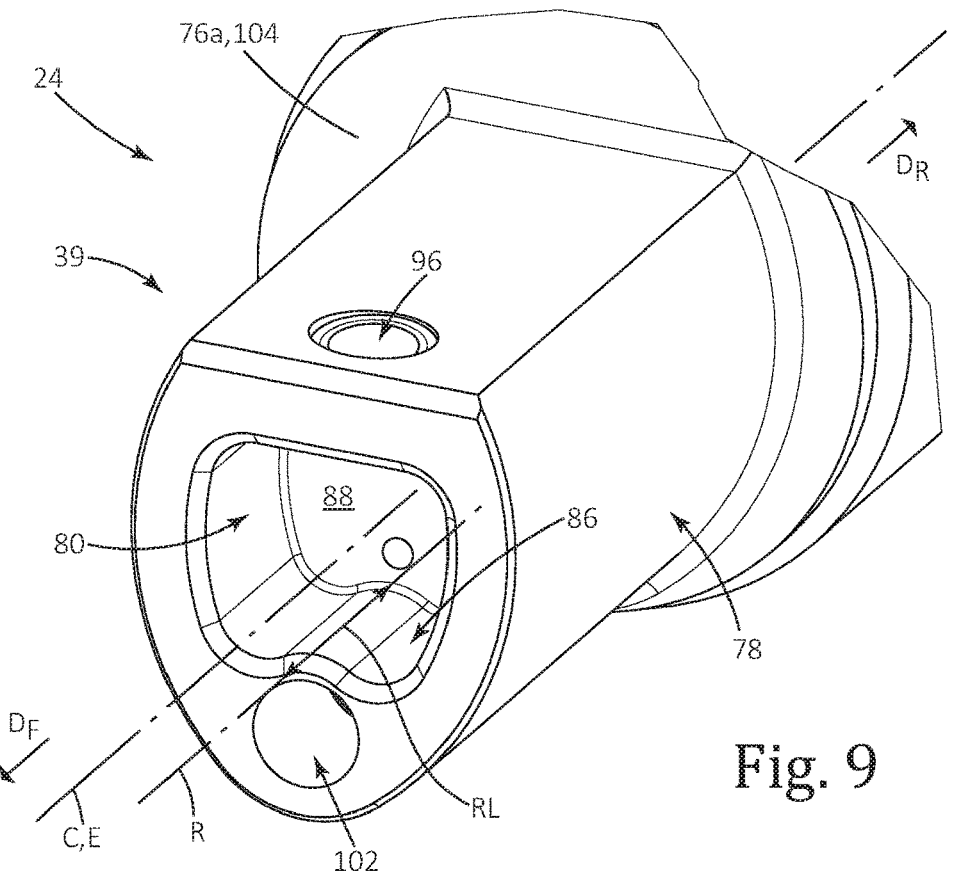
FIG. 9 is a perspective view of a forward end of a tool shank shown in FIGS. 1 and 2.

Referring to FIG. 9, the receptacle engagement ridge 90 has a ridge length RL. The ridge length RL is measured along the receptacle central axis E. In accordance with some embodiments of the subject matter of the present application, the receptacle engagement ridge 90 can extend lengthwise along an entire axial extent of the pin receptacle 80.

Figures 10, 11:
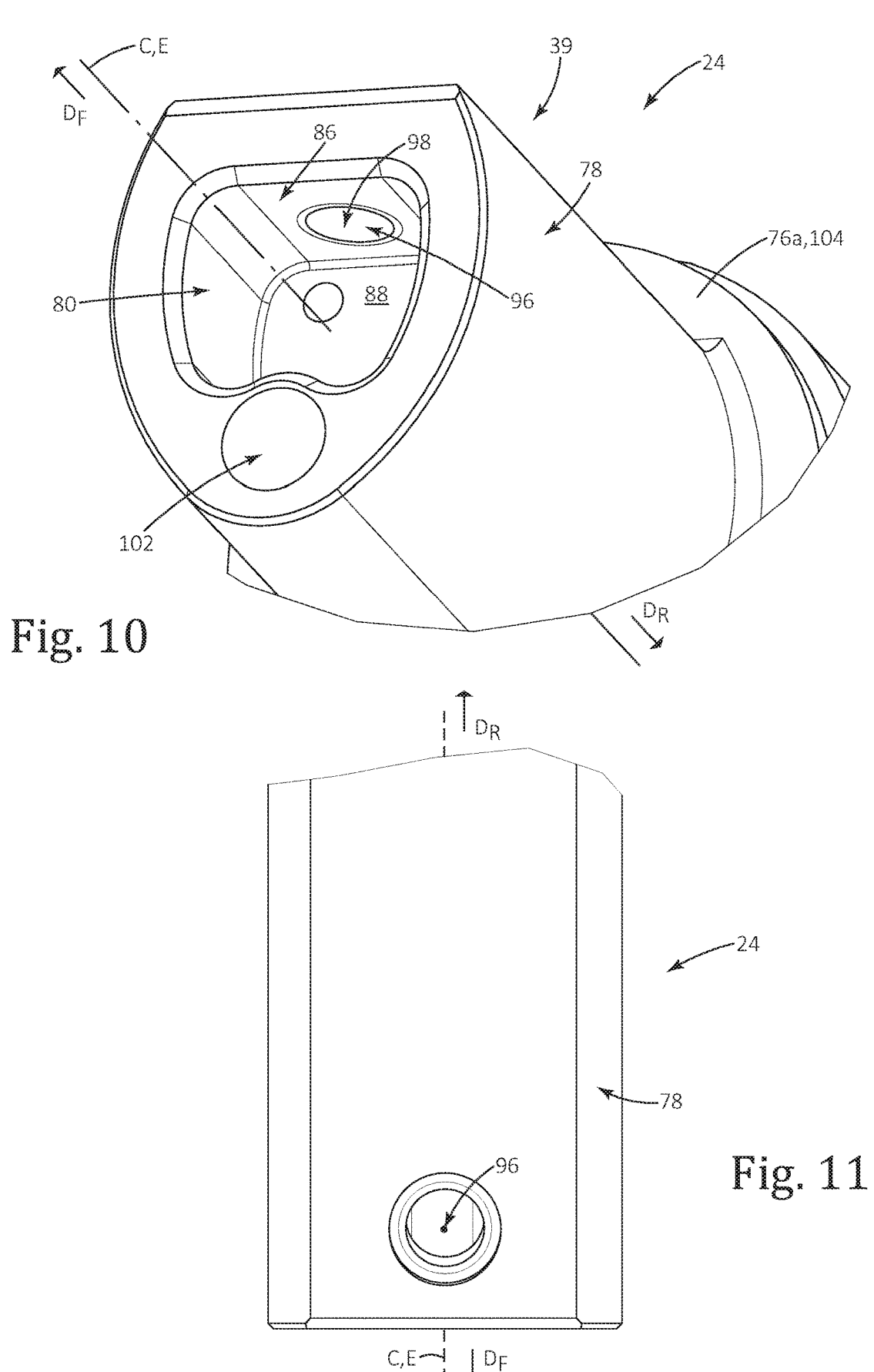
FIG. 10 is another perspective view of the forward end of a tool shank shown in FIG. 9.
FIG. 11 is a top view of the forward end of the tool shank shown in FIG. 9.

Referring to FIGS. 9 to 11, the cutting tool 20, 120 includes a clamping through bore 96 formed in whichever one of the head peripheral surface 36 and the shank peripheral surface 78 the pin receptacle 80 is recessed. The clamping through bore 96 is designed to receive the fastening member 28 as discussed later in the description. In accordance with the first embodiment, the clamping through bore 96 is formed in the shank peripheral surface 78, and in accordance with the second embodiment, the clamping through bore 96 is formed in the head peripheral surface 36.

The clamping through bore 96 opens out to the pin receptacle 80 at a receptacle through bore opening 98 (i.e., the clamping through bore 96 is formed on the same part as the pin receptacle 80). Specifically, the receptacle through bore opening 98 is located on the receptacle upper surface 116. The receptacle through bore opening 98 is located opposite the receptacle engagement ridge 90 about the receptacle central axis E. Thus, in accordance with some embodiments of the subject matter of the present application, the receptacle vertical plane RVP can intersect the receptacle through bore opening 98 and the receptacle engagement ridge 90.

In accordance with some embodiments of the subject matter of the present application, the cutting tool 20, 120 can include exactly one clamping through bore 96. The clamping through bore 96 can include an internal threaded portion 100. As seen in FIG. 13, the clamping through bore 96 can slant away from the first shank end surface 76a in a direction from the shank peripheral surface 78 to the receptacle through bore opening 98. The clamping through bore 96 can slant at a bore sloping angle α with respect to receptacle vertical axis VR. The bore sloping angle α can be greater than or equal to 6° and less than or equal to 10°. Preferably the bore sloping angle α can be equal to 8°.

As seen in FIGS. 11 and 13, the tool shank 24, 124 includes the aforementioned shank axial abutment surface 104 located on the first shank end surface 76a. In accordance with some embodiments of the subject matter of the present application, the shank axial abutment surface 104 can extend radially outwardly to the shank peripheral surface 78. The shank axial abutment surface 104 can be planar and extend perpendicularly to the shank central axis C.

In accordance with some embodiments of the subject matter of the present application, the tool shank 24, 124 can include a shank clamping threaded bore 102 recessed in the first shank end surface 76a. The shank clamping threaded bore 102 may be located beneath the receptacle engagement ridge 90 and/or be intersected by the receptacle vertical plane RVP and/or receptacle vertical axis VR. The shank clamping threaded bore 102 is designed to threadingly receive a clamping screw as described later in the description.

Referring to FIG. 13, in accordance with some embodiments of the subject matter of the present application, the tool shank 24, 124 can include a shank coolant channel 106. The shank coolant channel 106 has a shank coolant channel inlet 107i and a shank coolant channel outlet 1070. The shank coolant channel outlet 1070 is in fluid communication with the shank coolant channel inlet 107i through the shank coolant channel 106. The shank coolant channel inlet 107i is connected to a coolant source. The shank coolant channel outlet 1070 can be located on the receptacle rear surface 88.

Reverting to FIG. 1, in accordance with some embodiments of the subject matter of the present application, the cutting tool 20, 120 can include exactly one fastening member 28. The fastening member 28 can be rigidly formed. The fastening member 28 can include an external threaded portion 108. The fastening member 28 includes a clamping portion 110 that is designed to act on the clamping recess 58. The clamping portion 110 can have a planar shape. The clamping portion 110 and the external threaded portion 108 can be arranged at opposite ends of the fastening member 28. In this non-limiting example shown in the drawings, the fastening member 28 is a grub screw. Advantageously, the grub screw does not protrude from the clamping through bore 62.

Assembly of the cutting tool 20, 120 (i.e., adjusting the cutting tool 20, 120 to the locked position) is accomplished by performing the following steps. The coupling pin 38 is inserted in the pin receptacle 80 until the head axial abutment surface 66 abuts the shank axial abutment surface 104. During the insertion, the receptacle engagement ridge 90 slides along the pin engagement groove 52. The coupling pin 38 may only be inserted into the pin receptacle 80 in only a single rotatable position about the head central axis B. Next, the fastening member 28 is passed through the clamping through bore 96, so that the clamping portion 110 enters the pin receptacle 80 and comes into contact with the clamping recess 58 at the clamping recess abutment surface 60.

Figure 14:
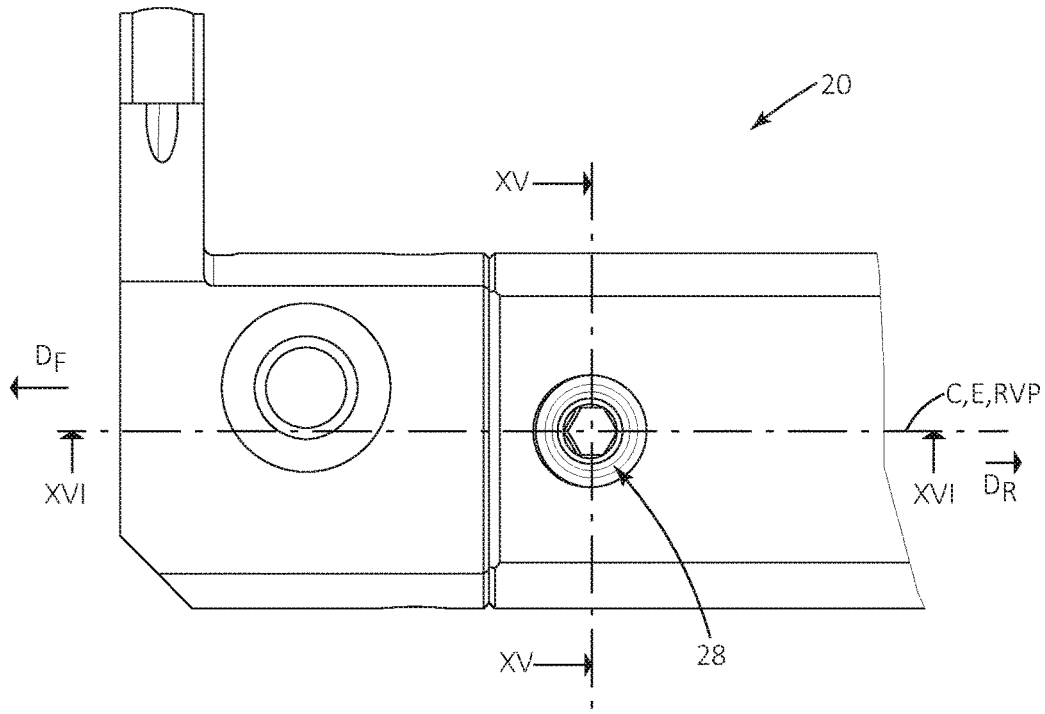
FIG. 14 is a top view of the forward end of the cutting tool shown in FIG. 9.
Figure 15:
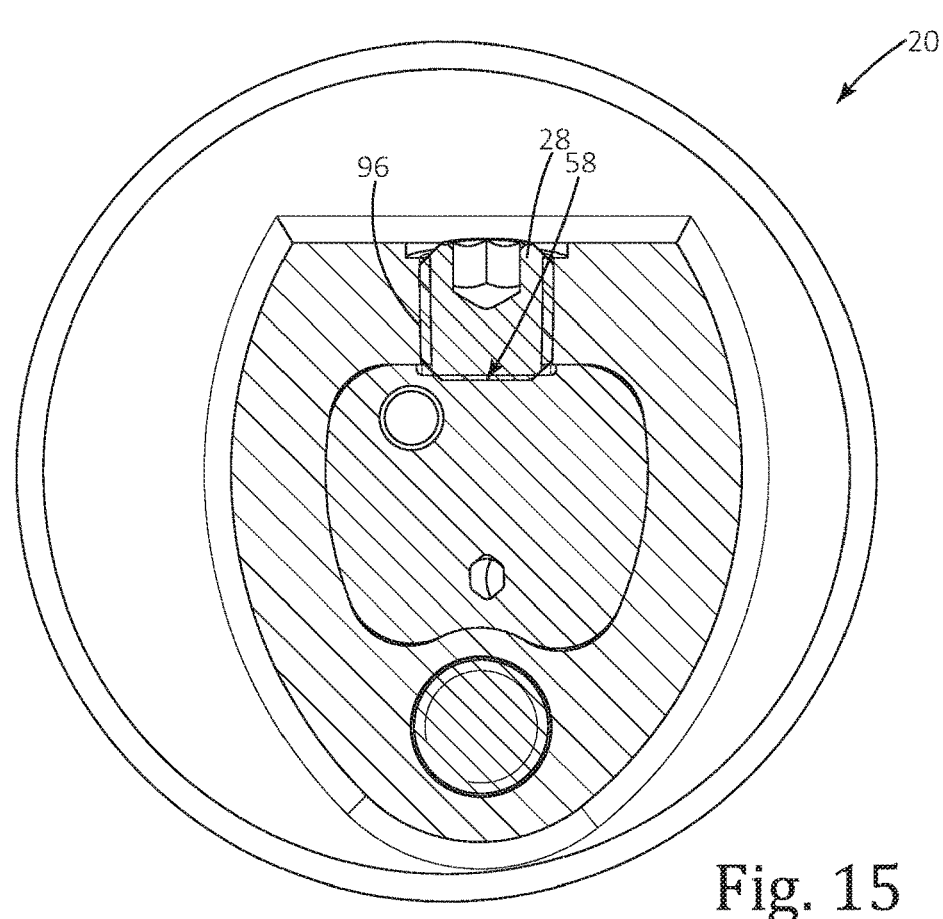
FIG. 15 is a cross-sectional view of the cutting tool taken along the line XV-XV in FIG. 14.
Figure 15A:
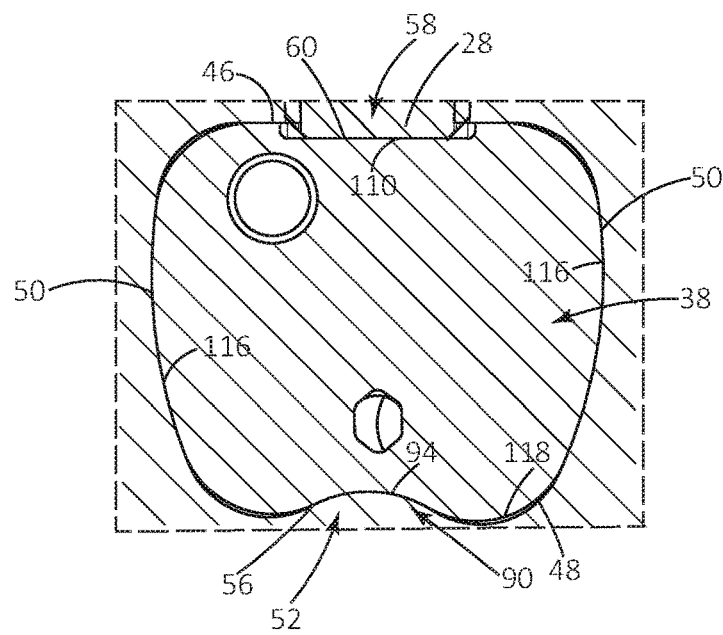
FIG. 15A is a detail of FIG. 15.
Figure 16:
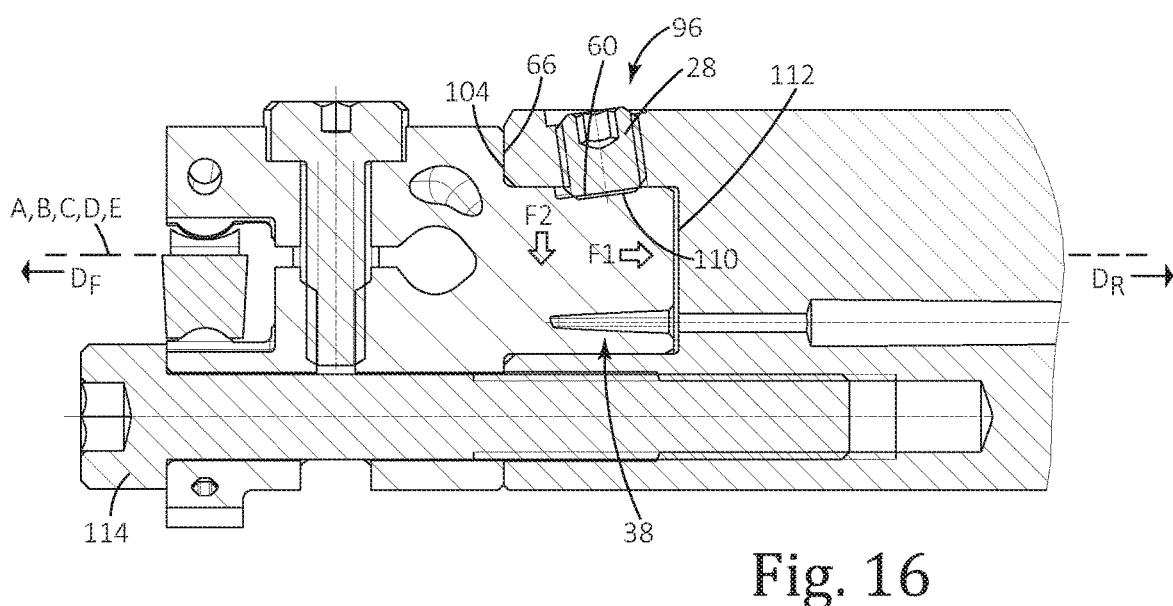
FIG. 16 is a cross-sectional view of the cutting tool taken along the line XVI-XVI in FIG. 14.

Referring to FIGS. 14 and 16, due to the orientation and position of the clamping recess abutment surface 60, further insertion of the fastening member 28 generates first and second clamping forces F1, F2 that act simultaneously on the clamping recess 58 of the coupling pin 38. As seen in FIG. 14, the first clamping force F1 acts in the axial direction and urges the cutting head 22, 122 and the tool shank 24, 124 to be displaced towards each other so that the head axial abutment surface 66 firmly abuts the shank axial abutment surface 104. The second clamping force F2 acts in a downward direction and urges the cutting head 22, 122 downwards so that the pin engagement groove 52 firmly abuts the receptacle engagement ridge 90. Thus, the cutting tool 22, 122 is releasably attached to the tool shank 24, 124 by the fastening member 28. Advantageously, the groove/ridge engagement prevents lateral displacement of the cutting head 22, 122, in particular at the lower region of the pin/receptacle, during cutting operations.

In accordance with some embodiments of the subject matter of the present application, the groove concavely curved portion 56 can abut the ridge convexly curved portion 94. Each pin side surface 50 can abut a respective receptacle side surface 199. The portion of the pin lower surface 48 where the pin engagement groove 52 is not located can be spaced apart from the portion of the receptacle lower surface 118 where the receptacle engagement ridge 90 is not located. In particular, the portion of the pin engagement groove 52 where the groove concavely curved portion 56 is not located can be spaced apart from the portion of the pin receptacle 80 where the ridge convexly curved portion 90 is not located.

In accordance with some embodiments of the subject matter of the present application, in the locked position, the external threaded portion 108 can be threadingly engaged with the internal threaded portion 100.

For heavy duty cutting or roughing operations where there are high cutting forces, a supplementary clamping screw 114 can be used to provide supplementary clamping of the cutting head 22, 122 to the tool shank 24, 124. In such a configuration, in the locked position, the supplementary clamping screw 114 is located in the head clamping through bore 62 and threadingly engaged with the shank clamping threaded bore 102.

In accordance with some embodiments of the subject matter of the present application, in the locked position of the cutting tool 20, 120, the head coolant channel 70 and shank coolant channel 106 can be in fluid communication with each other. The head coolant channel inlet 72i can be aligned with the shank coolant channel outlet 1070. As seen in FIG. 16, the head coolant channel 70 and shank coolant channel 106 can be in fluid communication with each other via a coolant reservoir 112 that is defined by a gap formed between the coupling pin 38 and the pin receptacle 80.

It can be seen from the foregoing that in one embodiment the coupling pin 38 is formed on the cutting head 22 and the pin receptacle 80 and the clamping through bore 96 are formed on the tool shank 24 while in another embodiment the coupling pin 38 is formed on the tool shank 124 and the pin receptacle 80 and the clamping through bore 96 are formed on the cutting head 122.

It is noted that, unlike cylindrical or square or oval coupling pins, the coupling pin of the invention can only be inserted into the pin receptacle in one rotational position.

It is further noted that, in the configuration where the pin upper surface 46 faces in the same direction as pocket seat surface 27a, the second clamping force F2 acts in a direction substantially normal to the pocket seat surface 27a.

It is yet further noted that, the rotary cutting tool 20, 120 described above is easy and quick to assemble.

Although the subject matter of the present application has been described to a certain degree of particularity, it should be understood that various alterations and modifications could be made without departing from the spirit or scope of the invention as hereinafter claimed. For example, the tool shank 24, 124 can be formed of multiple parts coupled together via a coupling mechanism of the type described above.

What is claimed is:

1. A cutting tool (20,120), having a tool central axis (A) that defines opposite forward and rearward directions (D_F, D_R), the cutting tool (20,120) including:

a cutting head (22, 122) comprising:

a head peripheral surface (36) extending circumferentially about the tool central axis (A) and forming a boundary of a rearwardly facing first head end surface (34a);

a head axial abutment surface (66) located on the first head end surface (34a), the head abutment surface (66) being planar and orthogonal to the head central axis (B); and an insert pocket (27);

a tool shank (24, 124) comprising:

a shank peripheral surface (78) extending circumferentially about the tool central axis (A) and forming a boundary of a forwardly facing first shank end surface (76a);

a shank axial abutment surface (104) located on the first shank end surface (76a); and a coupling pin (38) projecting from one of the first head end surface (34a) and the first shank end surface (76a), the coupling pin (38) comprising:

a pin outer peripheral surface (44) extending about a pin central axis (D);

a pin vertical axis (VP) which is perpendicular to, and intersects, the pin central axis (D) to thereby define a pin vertical plane (PVP);

a pin engagement groove (52) recessed in the pin outer peripheral surface (44) and extending from a pin free end (41) towards a pin fixed end (40) along a groove longitudinal axis (G); and a clamping recess (58) recessed in the pin outer peripheral surface (44) opposite the pin engagement groove (52) about the pin central axis (D);

a pin receptacle (80) recessed in the other of the first head end surface (34a) and the first shank end surface (76a), the pin receptacle (80) comprising:

a receptacle inner peripheral surface (86) extending about a receptacle central axis (E);

a receptacle vertical axis (VR) which is perpendicular to, and intersects, the receptacle central axis (E) to thereby define a receptacle vertical plane (RVP); and a receptacle engagement ridge (90) protruding from the receptacle inner peripheral surface (86) and extending from a receptacle open end (82) towards a receptacle bottom end (84) along a ridge longitudinal axis (R); and a clamping through bore (96) formed in whichever one of the head peripheral surface (36) and the shank peripheral surface (78) the pin receptacle (80) is recessed, and opening out to the pin receptacle (80) at a receptacle through bore opening (98) located opposite the receptacle engagement ridge (90) about the receptacle central axis (E), wherein:

the cutting tool (20, 120) is adjustable between a released position and a locked position, and in the locked position:

the coupling pin (38) is received into the pin receptacle (80); and a fastening member (28) passes through the clamping through bore (96) and acts on the clamping recess (58) of the coupling pin (38), so that:

the pin engagement groove (52) abuts the receptacle engagement ridge (90);

the head axial abutment surface (66) abuts the shank axial abutment surface (104); and the cutting head (22, 122) and tool shank (24, 124) are releasably attached together.

2. The cutting tool (20), according to claim 1, wherein:

the coupling pin (38) projects from the first head end surface (34a);

the pin receptacle (80) is recessed in the first shank end surface (76a); and the clamping through bore (96) is formed in the shank peripheral surface (78).

3. The cutting tool (20), according to claim 1, wherein:

the pin engagement groove (52) comprises a groove concavely curved portion (56) extending along the groove longitudinal axis (G);

the receptacle engagement ridge (90) comprises a ridge convexly curved portion (94) extending along the along the ridge longitudinal axis (R); and in the locked position, the groove concavely curved portion (56) abuts the ridge convexly curved portion (94).

4. The cutting tool (20, 120), according to claim 1, wherein:

the cutting tool (20, 120) comprises a single centrally disposed coupling pin (38) and a single centrally disposed pin receptacle (80).

5. The cutting tool (20,120), according to claim 1, wherein:

the cutting tool (20,120) comprises exactly one fastening member (28) and exactly one clamping through bore (96) for securing the cutting head (22, 122) to the tool shank (24, 124); and the coupling pin (38) comprises exactly one clamping recess (58).

6. The cutting tool (20,120), according to claim 1, wherein:

the clamping through bore (96) comprises an internal threaded portion (100);

the fastening member (28) comprises an external threaded portion (108); and in the locked position, the external threaded portion (108) is threadingly engaged with the internal threaded portion (100).

7. The cutting tool (20,120), according to claim 1, wherein:

the cutting tool (20,120) comprises a supplementary clamping screw (114);

the cutting head (22, 122) comprises a head clamping through bore (62) recessed in the second head end surface (34b) and opening out to the first head end surface (34a); and the tool shank (24, 124) comprises a shank clamping threaded bore (102) recessed in the first shank end surface (76a); and in the locked position, the supplementary clamping screw (114) is located in the head clamping through bore (62) and threadingly engaged with the shank clamping threaded bore (102).

8. The cutting tool (120), according to claim 1, wherein:

the coupling pin (38) projects from the first shank end surface (76a);

the pin receptacle (80) is recessed in the first head end surface (34a); and the clamping through bore (96) is formed in the head peripheral surface (36).

9. A cutting head (22, 122), having a head central axis (B) that defines opposite forward and rearward directions ($D_F$, $D_R$), the cutting head (22, 122) comprising:

a head peripheral surface (36) extending circumferentially about the head central axis (B) and forming a boundary of a rearwardly facing first head end surface (34a);

a head axial abutment surface (66) located on the first head end surface (34a), the head abutment surface (66) being planar and orthogonal to the head central axis (B);

an insert pocket (27); and either:

a coupling pin (38) projecting from the first head end surface (34a), the coupling pin (38) comprising:

a pin outer peripheral surface (44) extending about a pin central axis (D);

a pin vertical axis (VP) which is perpendicular to, and intersects, the pin central axis (D) to thereby define a pin vertical plane (PVP);

a pin engagement groove (52) recessed in the pin outer peripheral surface (44) and extending from a pin free end (41) towards a pin fixed end (40) along a groove longitudinal axis (G); and a clamping recess (58) recessed in the pin outer peripheral surface (44) opposite the pin engagement groove (52) about the pin central axis (D); or;

a pin receptacle (80) recessed the first head end surface (34a), the pin receptacle (80) comprising:

a receptacle inner peripheral surface (86) extending about a receptacle central axis (E);

a receptacle vertical axis (VR) which is perpendicular to, and intersects, the receptacle central axis (E) to thereby define a receptacle vertical plane (RVP); and a receptacle engagement ridge (90) protruding from the receptacle inner peripheral surface (86) and extending from a receptacle open end (82) towards a receptacle bottom end (84) along a ridge longitudinal axis (R); and a clamping through bore (96) recessed in the head peripheral surface (36) and opening out to the pin receptacle (80) at a receptacle through bore opening (98) located opposite the receptacle engagement ridge (90) about the receptacle central axis (E).

10. The cutting head (22), according to claim 9, wherein: the coupling pin (38) projects from the first head end surface (34a).

11. The cutting head (22, 122), according to claim 10, wherein:

the pin vertical plane (PVP) intersects the pin engagement groove (52); and the pin engagement groove (52) exhibits mirror asymmetry about the pin vertical plane (PVP).

12. The cutting head (22, 122), according to claim 10, wherein:

the pin engagement groove (52) comprises two opposing groove side surfaces (54) which slope inwardly in opposite widthwise directions of the pin engagement groove (52), so that they converge towards each other.

13. The cutting head (22, 122), according to claim 12, wherein:

the two groove side surfaces (54) intersect each other.

14. The cutting head (22, 122), according to claim 12, wherein:

the pin engagement groove (52) comprises a groove concavely curved portion (56) which extends along the groove longitudinal axis (G) and connects the two groove side surfaces (54).

15. The cutting head (22, 122), according to claim 14, wherein:

the groove concavely curved portion (56) is defined by a groove concave radius (GR); and the groove concave radius (GR) fulfils the condition: 2.8 mm≤GR≤3.6 mm.

16. The cutting head (22, 122), according to claim 10, wherein:

the pin engagement groove (52) has a groove depth (GD); and the groove depth (GD) fulfils the condition: 0.3 mm≤GD≤0.7 mm.

17. The cutting head (22, 122), according to claim 10, wherein:

the pin engagement groove (52) has a groove width (GW); and the groove width (GW) fulfils the condition: 5.0 mm≤GW≤5.84 mm.

18. The cutting head (22, 122), according to claim 10, wherein:

the pin engagement groove (52) extends lengthwise along an entire axial extent of the coupling pin (38).

19. The cutting head (22, 122), according to claim 10, wherein:

the groove longitudinal axis (G) is parallel to the pin central axis (D).

20. The cutting head (22, 122), according to claim 10, further comprising:

a head coolant channel (70) having a head coolant channel inlet (72i) and a head coolant channel outlet (720); wherein:

the coupling pin (38) comprises a pin rear surface (42) bounded by the pin outer peripheral surface (44); and the head coolant channel inlet (72i) is located on the pin rear surface (42).

21. The cutting head (22, 122), according to claim 20, wherein:

the pin engagement groove (52) extends to the pin rear surface (41).

22. The cutting head (22, 122), according to claim 10, further comprising:

a second head end surface (34b) opposite the first head end surface (34a); and a head clamping through bore (62) recessed in the second head end surface (34b) and opening out to the first head end surface (34a).

23. The cutting head (22, 122), according to claim 10, wherein:

the pin outer peripheral surface (44) comprises opposing pin upper and lower surfaces (46, 48) and two opposing pin side surfaces (50) which connect the pin upper and lower surfaces (46, 48);

the clamping recess (58) is located on the pin upper surface (46); and the clamping recess (58) comprises a clamping recess abutment surface (60) which slopes towards a pin median plane (MP) containing the pin central axis (D) and extending through the two opposing pin side surfaces (50), in a direction towards the first head end surface (34a).

24. The cutting head (22, 122), according to claim 23, wherein:

the insert pocket (27) comprises a pocket seat surface (27a) configured to seat a cutting insert (26), the pocket seat surface (27a) facing in the same direction as the pin upper surface (46).

* * * * *